(12) United States Patent
Colotte et al.

(10) Patent No.: US 8,858,164 B2
(45) Date of Patent: Oct. 14, 2014

(54) AIR DISCHARGE SYSTEM FOR AN AERONAUTICAL TURBINE ENGINE COMPRESSOR

(75) Inventors: Baptiste Colotte, Melun (FR); Bruno Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 834 days.

(21) Appl. No.: 12/999,790

(22) PCT Filed: Jun. 15, 2009

(86) PCT No.: PCT/FR2009/051128
§ 371 (c)(1),
(2), (4) Date: Dec. 17, 2010

(87) PCT Pub. No.: WO2009/153510
PCT Pub. Date: Dec. 23, 2009

(65) Prior Publication Data
US 2011/0097196 A1    Apr. 28, 2011

(30) Foreign Application Priority Data
Jun. 18, 2008   (FR) ...................................... 08 54012

(51) Int. Cl.
*F01D 17/00* (2006.01)
*F02K 3/075* (2006.01)
*F04D 27/02* (2006.01)

(52) U.S. Cl.
CPC ............. *F02K 3/075* (2013.01); *F05D 2270/58* (2013.01); *Y02T 50/671* (2013.01); *F04D 27/0215* (2013.01)
USPC .............................. 415/145; 251/83; 251/251

(58) Field of Classification Search
CPC .................................................. F05D 2270/58
USPC ................ 251/82, 83, 251; 123/90.48, 90.52; 415/145
See application file for complete search history.

(56) References Cited

U.S. PATENT DOCUMENTS 2,562,918 A * 8/1951 Hynes .............................. 454/74
3,996,964 A * 12/1976 McCombs .................... 137/885
(Continued)

FOREIGN PATENT DOCUMENTS

| CA | 2 208 801 | 12/1998 |
|---|---|---|
| EP | 1 637 784 | 3/2006 |

(Continued)

OTHER PUBLICATIONS

International Search Report issued Nov. 4, 2009 in PCT/FR09/51128 filed Jun. 15, 2009.

*Primary Examiner* — Ned Landrum
*Assistant Examiner* — Justin Seabe
(74) *Attorney, Agent, or Firm* — Oblon, Spivak, McClelland, Maier & Neustadt, L.L.P.

(57) ABSTRACT

An air discharge system for an aviation turbomachine compressor is disclosed. The discharge system includes at least one discharge valve. Each valve includes a valve body suitable for moving between an open position and a closed position of the discharge valve, a camshaft including a cylindrical rod carrying a cam mounted to bear against the valve body in such a manner that rotating the camshaft causes the valve body to move between its open and closed positions, and a device for keeping the cam bearing permanently against the valve body. The discharge system further includes at least one main electric motor having its rotor suitable for driving the camshaft of each discharge valve in rotation, and an electronic control system for controlling each main electric motor.

11 Claims, 3 Drawing Sheets

(56) References Cited

U.S. PATENT DOCUMENTS

| | | |
|---|---|---|
| 4,179,944 A | 12/1979 | Conner |
| 4,521,863 A * | 6/1985 | Solaroli ................... 702/158 |
| 5,685,141 A | 11/1997 | Markstein et al. |
| 6,971,628 B2 * | 12/2005 | Ichimaru ................. 251/129.11 |
| 2002/0121255 A1 * | 9/2002 | Speil et al. ................. 123/90.52 |
| 2002/0170295 A1 | 11/2002 | Chapman |
| 2007/0272185 A1 * | 11/2007 | Best .......................... 123/90.48 |
| 2011/0031426 A1 * | 2/2011 | Tyler ............................. 251/251 |

FOREIGN PATENT DOCUMENTS

| | | |
|---|---|---|
| EP | 1 793 477 | 6/2007 |
| WO | 97 23719 | 7/1997 |
| WO | 2004 104377 | 12/2004 |

* cited by examiner

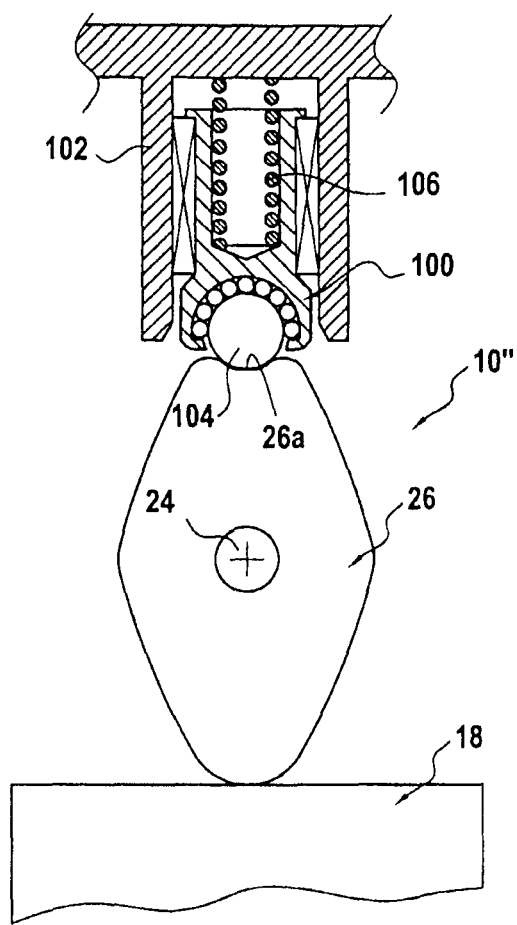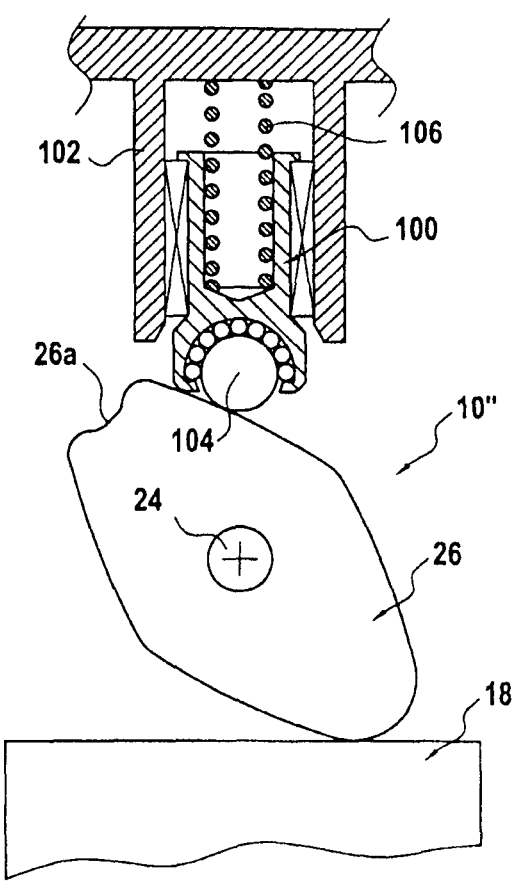

AIR DISCHARGE SYSTEM FOR AN AERONAUTICAL TURBINE ENGINE COMPRESSOR

BACKGROUND OF THE INVENTION

The present invention relates to the general field of air discharge systems in a compressor of an aviation turbomachine.

During certain stages in the operation of an aviation turbomachine of the bypass type, it is known to divert a fraction of the air flowing in the primary channel of the turbomachine in order to take the air into the secondary channel (coaxial with the primary channel) so as to increase temporarily the aerodynamic stability of the flow of air through the compressor. To this end, the compressor of the turbomachine includes in its outer shroud air takeoff orifices that open out into the secondary channel.

Air discharge valves serve to control the flow rate of air that is taken from the compressor and injected into the secondary channel. Different types of air discharge valve are known. For example, there are butterfly valves or poppet valves. These discharge valves are generally driven independently via individual controls (e.g. one hydraulic actuator per butterfly valve or a pneumatic system having one solenoid valve per poppet valve).

Such air discharge valves present numerous drawbacks. In particular, the use of hydraulic or pneumatic control members for activating discharge valves presents the drawback of requiring pipework for conveying the control fluid, and also solenoid valves, filters, etc. Unfortunately, such equipment presents a high cost, and non-negligible weight and size. Furthermore, poppet or butterfly type discharge valves are not accurate, such that it is generally difficult to have good control over the air flow rate that is taken off. There therefore exists a risk that too much air will often be taken from the compressor, with all the drawbacks to which that leads (risk of breaking blades, influence on cabin pressure, etc).

OBJECT AND SUMMARY OF THE INVENTION

A main object of the present invention is thus to mitigate such drawbacks by proposing an air discharge system for a compressor that enables good control to be obtained over the flow rate of the air that is taken off, and to do so at little cost, reduced weight and size, and with power consumption that is low.

According to the invention, this object is achieved by an air discharge system comprising:
  at least one discharge valve comprising:
    a valve body suitable for moving between an open position corresponding to the discharge valve being open and a closed position corresponding to the discharge valve being closed;
    a camshaft comprising a cylindrical rod provided with a cam, said cam being mounted to bear against the valve body in such a manner that rotating the camshaft causes the valve body to move between its open and closed positions; and
    means to keep the cam bearing permanently against the valve body;
  at least one main electric motor having its rotor suitable for driving the camshaft of each discharge valve in rotation; and
  an electronic control system for each main electric motor.

Such an air discharge system presents numerous advantages over systems of the prior art. In particular, such a system has no pipework, no hydraulic or pneumatic control system, no source of hydraulic or pneumatic power, etc. The cost, weight, and size of such a system are thereby greatly reduced.

Furthermore, the use of the camshaft driven by an electric motor enables greater flexibility to be achieved over adjusting the flow rate of air taken from the compressor (each discharge valve may be driven independently of the others with great precision depending on the cam shape that is selected).

Furthermore, by adjusting the shape of the cam, it is possible to obtain different equilibrium positions therefor, the equilibrium positions advantageously corresponding to the open and closed positions of the controlled discharge valve. This results in the system consuming practically no power when the discharge valve is in either of these two positions.

In an embodiment, the system includes a plurality of discharge valves and a single main electric motor, the camshafts of the discharge valves being connected together by a movement transmission cable.

In another embodiment, the system includes a plurality of discharge valves, one particular main electric motor being associated with each discharge valve to drive its camshaft in rotation.

Each discharge valve may include a spring mounted around the valve body in such a manner as to keep the cam bearing permanently against the valve body.

Alternatively, the valve body of each discharge valve may include a recess receiving a cam of circular shape, the cam and the recess being dimensioned in such a manner that said cam bears permanently against two side walls of said recess.

In another alternative, each discharge valve may include a ball bushing slidably mounted inside a stationary structure and having a head that is mounted to bear against the cam, the ball bushing including a return spring suitable for keeping the head bearing permanently against the cam, such that the cam remains bearing permanently against the valve body.

Preferably, the system further includes, for each main electric motor, a secondary electric motor having its rotor in common with the rotor of the main electric motor, each secondary electric motor being controlled by the electronic control system. The use of the secondary motor for driving the camshaft(s) serves to mitigate any possible failure of a main electric motor.

Preferably, for each electric motor, the electronic control system includes a device for measuring the current needed to actuate the motor before it starts, and means for comparing the measured current value with a predetermined threshold value. The threshold value is predetermined depending on the value of the current that is needed to actuate the electric motor in normal operation. Thus, if the measured current value is greater than said threshold value, then the electronic control system deduces that there is an opposing force or abnormal friction in the driving connection, and it may issue an alarm accordingly.

The electronic control system is advantageously an electronic module of a full authority digital engine control system of the turbomachine.

The invention also provides an aviation turbine compressor and an aviation turbomachine including an air discharge system as defined above.

BRIEF DESCRIPTION OF THE DRAWINGS

Other characteristics and advantages of the present invention appear from the following description made with reference to the accompanying drawings, which show embodiments having no limiting character. In the figures:

FIGS. 5A and 5B are longitudinal section views of a valve of an air discharge system in yet another variant embodiment.

DETAILED DESCRIPTION OF EMBODIMENTS

The air discharge system of the invention applies to the compressors of an aviation turbomachine. It enables a fraction of the air flowing in the primary channel of the turbomachine to be taken off and diverted into its secondary channel (coaxial with the primary channel) in order temporarily to increase the aerodynamic stability of the airflow through the compressor.

In known manner, such an air discharge system has a plurality of discharge valves and means for actuating these valves.

Figure 1:
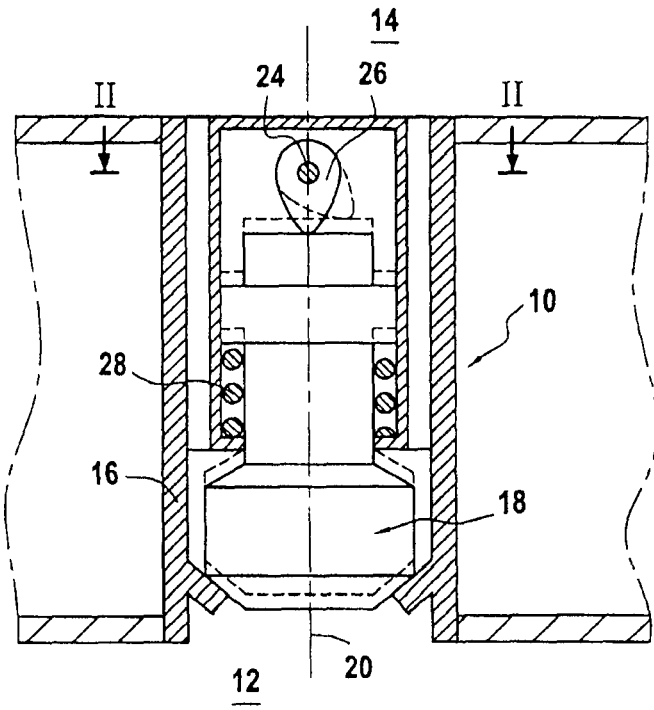
FIG. 1 is a longitudinal section view of a portion of an air discharge system of the invention.

FIG. 1 is a longitudinal section view of an embodiment of a discharge valve 10 suitable for fitting to the air discharge system of the invention.

Each discharge valve 10 is placed between the primary channel 12 of the turbomachine (level with one of its compressors) and its secondary channel 14. More precisely, in its outer shroud, the annular compressor of the turbomachine includes one or more air bleed orifices (not shown) opening out into the secondary channel 14 via the discharge valves.

In particular, each discharge valve 10 includes a substantially cylindrical air passage 16 extending between the primary and secondary channels 12 and 14, together with a valve body 18 forming a body of revolution that is centered on the longitudinal axis 20 of the air passage and that is mounted inside it.

The valve body 18 is suitable for moving axially inside the air passage 16 under the action of actuator means that are described below.

More precisely, the valve body 18 is free to move inside the air passage 16 back and forth between two extreme axial positions; namely an "open" position (shown in dashed lines in FIG. 1) enabling a fraction of the air flowing in the primary channel 12 to be taken off and injected into the secondary channel 14 by flowing along the air passage (going around the valve body 18); and an opposite, or "closed" position (shown in continuous lines in FIG. 1) in which the valve body 18 closes the air passage, thus preventing the air that is flowing in the primary channel being injected into the secondary channel.

For each valve, the air discharge system also includes a camshaft 22. This comprises a cylindrical rod 24 (FIG. 2) provided with a cam 26, the cam being mounted to bear against the valve body 18 in such a manner that rotation of the camshaft causes the valve body to move between its open and closed positions.

More precisely, the cam 26 is mounted to bear against the end of the valve body 18 that is opposite from its end that closes the air passage 16 when the valve body is in the closed position. Furthermore, the cylindrical rod 24 is placed in a direction that is substantially perpendicular relative to the longitudinal axis 20 of the air passage 16.

Finally, a return spring 28 is mounted around the body 18 of each valve so as to keep the cam 26 bearing permanently against the valve body.

There follows a description of different ways of actuating the valves of the air discharge system of the invention.

Figure 2:
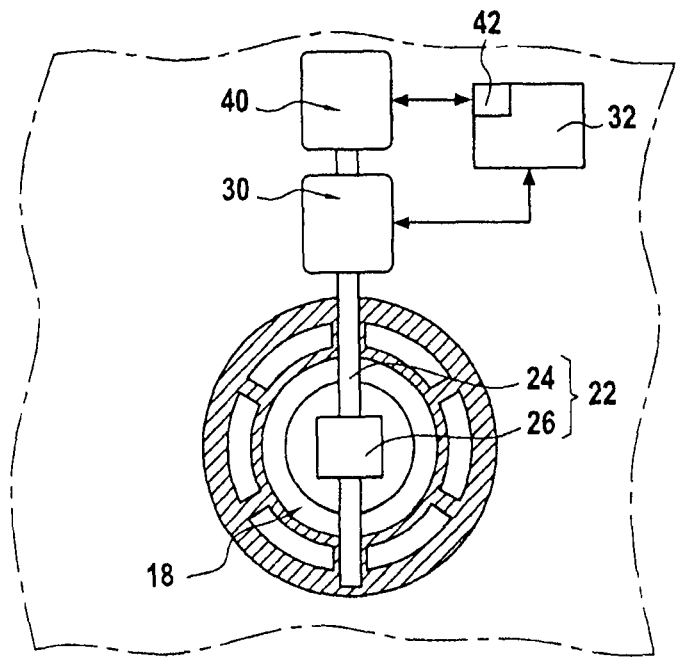
FIG. 2 is a section view on II-II of FIG. 1.

In a first embodiment shown in FIGS. 1 and 2, the means for actuating the valves comprise a main electric motor 30 for each discharge valve 10. More precisely, the cylindrical rod 24 of the camshaft 22 of each discharge valve 10 is connected to the rotor of a main electric motor 30 so as to be rotated thereby.

Furthermore, in this first embodiment, each main electric motor is controlled by an electronic control system 32 (FIG. 2). By way of example, the electronic control system 32 may be an electronic module of the "Full Authority Digital Engine Control" (FADEC) system for automatically regulating the airplane engine.

The operation of the air discharge system in this first embodiment is as follows. As a function of the operating speed of the turbomachine, the electronic control system 32 sends an order to each main electric motor 30 to actuate the camshaft 22 associated with the corresponding discharge valve 10 in order to open or close it. Since the electronic system 32 controls each valve of the air discharge system independently, it is possible to obtain great flexibility in adjusting the flow rate of air taken from the compressor.

Figure 3:
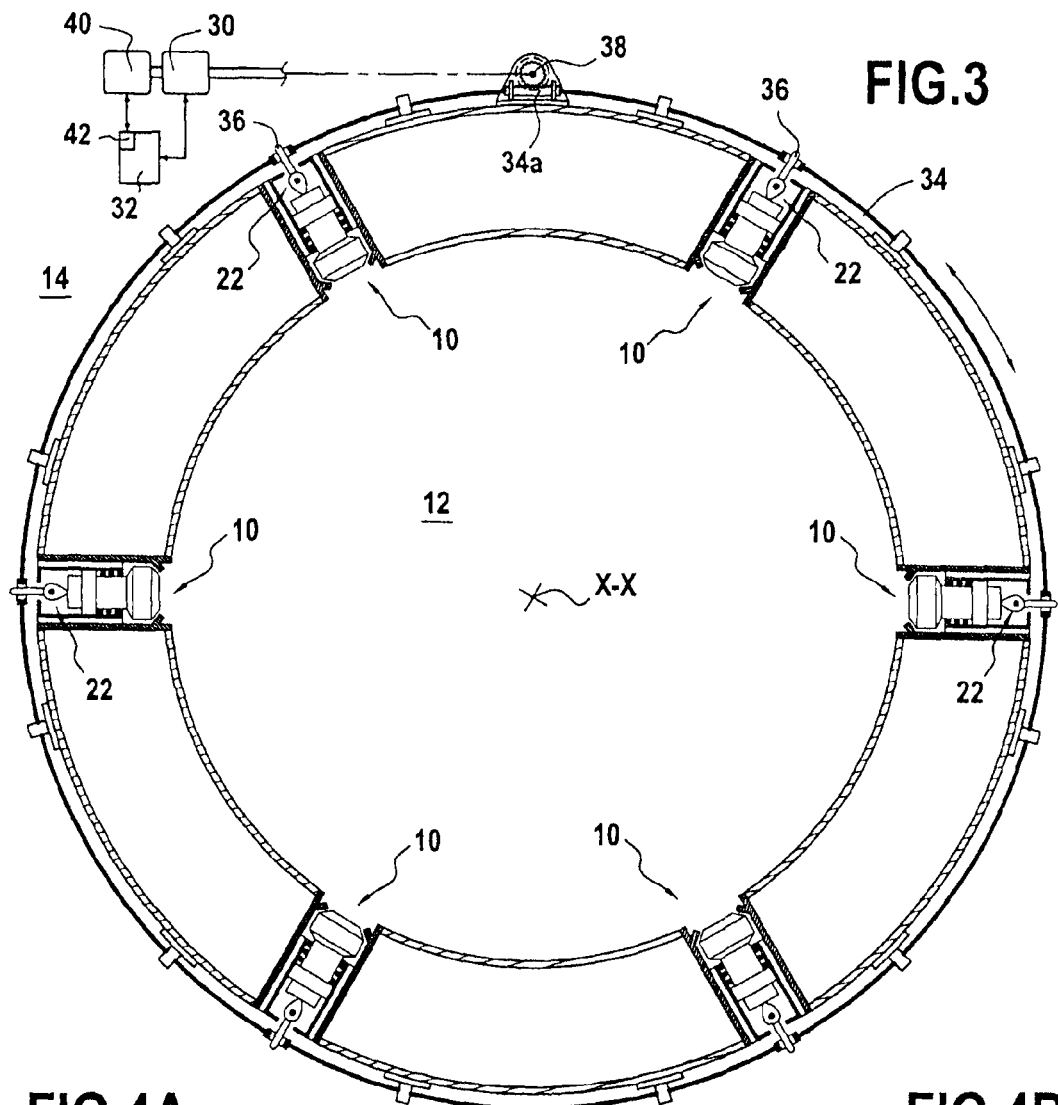
FIG. 3 is a longitudinal section view of an air discharge system in a variant embodiment.

In the second embodiment shown in FIG. 3, the means for actuating the discharge valve 10 comprise a single main electric motor 30 controlling all of the discharge valves.

More precisely, the camshafts 22 of the discharge valves are connected together by a movement transmission cable 34 by means of control links 36 connected to the cylindrical rods. By means of a system comprising a gear wheel 38 coupled to the main electric motor 30 and meshing with a toothed portion 34a of the transmission cable, the rotary motion of the motor 30 is transformed into rotary motion of the cable around the longitudinal axis X-X of the compressor.

As for the first embodiment, the main electric motor 30 is controlled by an electronic control system 32 (possibly being the FADEC of the turbomachine).

The operation of the air discharge system in this second embodiment is as follows. Depending on the speed of operation of the turbomachine, the electronic control system 32 sends an actuation order to the main electric motor 30, which order is converted into a rotary movement of the movement transmission cable 34. The rotation of the cable about the axis X-X (in one direction of rotation or in the other) causes the cams associated with each of the discharge valves to pivot so as to open or close them simultaneously.

In this second embodiment, the angular positions at rest of the cams may be set differently (relative to a common reference) for each of the discharge valves. Thus, it is possible to cause the opening and closing of the discharge valves to be offset. This increases the flexibility with which it is possible to adjust the flow rate of the air taken from the compressor.

It is possible to devise variants of this second embodiment. For example, the cam shafts of all of the discharge valves could be connected together by a mechanical control cable of the "push-pull" type, the cable being associated with an electric actuator.

There follows a description of certain characteristics that are common to both above-described embodiments of the air discharge system.

Figure 4A:
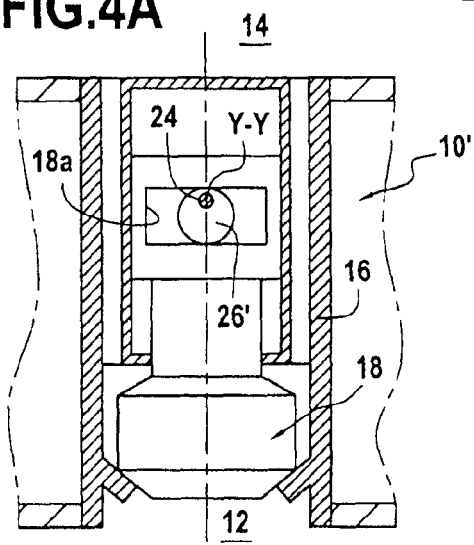
FIGS. 4A and 4B are longitudinal section views of a valve of an air discharge system in another variant embodiment.
Figure 4B:
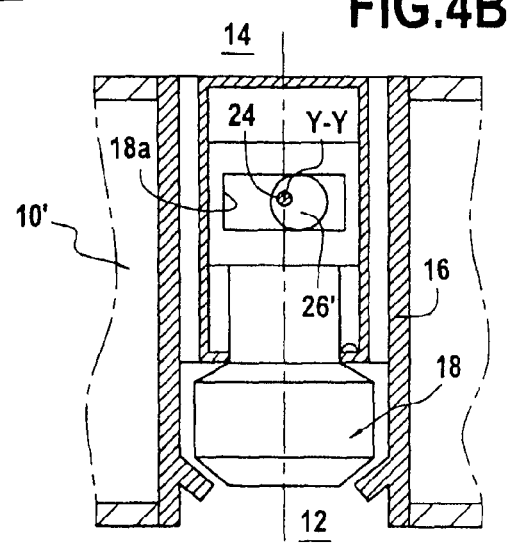

In particular, FIGS. 4A and 4B show a variant embodiment of a valve of the air discharge system. Compared with the embodiment described with reference to FIGS. 1 and 2, the discharge valve 10' shown in these figures does not have a return spring for keeping the cam bearing permanently against the valve body 18.

Instead, the valve body 18 of the discharge valve includes a recess 18a in which there is received a cam 26' of circular shape, the cam and the recess being of dimensions such that the cam bears permanently against both side walls of said recess. Furthermore, the axis of rotation Y-Y of the cam 26' is eccentric relative to its axis of symmetry, thereby rotating the cam 26' causes the valve body to move longitudinally. Thus, in FIG. 4A, the valve body is in is closed position, and after the cam 26' has rotated about the axis Y-Y, the valve body is in its open position (FIG. 4B).

FIGS. 5A and 5B show another variant embodiment of a valve of an air discharge system. Compared with the preceding embodiments, the discharge valve 10" shown in these figures has neither a spring nor a recess for keeping the cam bearing permanently against the valve body 18.

Instead, the discharge valve 10" includes a ball bushing 100 that is slidably mounted inside a stationary structure 102 and that has a head 104 bearing against the cam 26. Furthermore, the bushing 100 is fastened at one end to a return spring 106 having its other end fastened to the structure 102. The return spring is pretensioned so as to keep the head 104 of the ball bushing bearing permanently against the cam 26. Thus, the cam is caused to bear permanently against the valve body 18.

In this variant embodiment, the head 104 is a rotary ball. Nevertheless, this ball could be replaced by a flexible blade. Furthermore, the cam 26 presents a notch 26a in which the head 104 rests when the discharge valve is in the position shown in FIG. 5A. This equilibrium position advantageously corresponds to a position in which the discharge valve is closed, FIG. 5B showing the discharge valve 10" in an open position.

With such a variant embodiment, it is thus easy to index each discharge valve angularly in such a manner as to obtain great accuracy in adjusting the opening and closing of the discharge valves.

According to an advantageous characteristic of the invention that is common to all of the above-described embodiments, each main electric motor 30 is associated with a secondary electric motor 40 having its rotor in common with the rotor of the main electric motor (FIGS. 2 and 3).

Each secondary electric motor 40 is controlled by the electronic control system 32 independently of the main motor 30. Furthermore, each of the main and secondary electric motors presents torque that is sufficient for driving the camshafts of the entire air discharge system, even in the event of one of electric motors being short-circuited. Such redundancy serves to overcome potential failure of the main electric motor.

According to another advantageous characteristic of the invention that is common to all of the above-described embodiments, for each (main and/or secondary) electric motor, the electronic control system 32 includes a device 42 for measuring the current needed to actuate the motor before starting it, and means of comparing the measured current value with a predetermined threshold value.

The threshold value is predetermined depending on the value of the current needed to actuate the electric motor 30, 40 for normal operation. Thus, if the measured current value is greater than the threshold value, then the electronic control system 42 deduces that there is an opposing force or abnormal friction in the drive system for driving the discharge valve in question, and it may issue an alarm accordingly.

More generally, the air discharge system of the invention may be adjusted in various ways. In particular, each valve of the air discharge system may present a particular size that imparts a particular air flow rate thereto. Likewise, the shape of the cam may vary from one discharge valve to another in order to provide an opening and closing offset between the valves. Finally, by adjusting the shape of each cam, it is possible to obtain different equilibrium positions for the cam, it being possible for these equilibrium positions to correspond advantageously to the open and closed positions of the controlled discharge valve.

The invention claimed is:

1. An air discharge system for a compressor of an aviation turbomachine, comprising:
a discharge valve disposed between a primary channel of the turbomachine and a secondary channel of the turbomachine, the primary channel being level with the compressor, and an outer shroud of the compressor including an air bleed orifice opening out into the secondary channel via the discharge valve, the discharge valve comprising:
an air passage extending between the primary channel and the secondary channel;
a valve body which moves inside the air passage between an open position, in which a fraction of air flowing in the primary channel is taken off and injected into the secondary channel by flowing along the air passage, corresponding to the discharge valve being open and a closed position, in which the valve body closes the air passage and prevents the air flowing in the primary channel to be injected into the secondary channel corresponding to the discharge valve being closed, the valve body presenting a body of revolution which is centered on a longitudinal axis of the air passage;
a camshaft including a cylindrical rod provided with a cam, said cam being mounted to press against the valve body in such a manner that rotating the camshaft causes the valve body to move between the open and closed positions; and
a device which maintains the cam to permanently press against the valve body;
a main electric motor having a rotor which drives the camshaft of the discharge valve in rotation;
a secondary electric motor having a rotor in common with the rotor of the main electric motor; and
an electronic control system configured to control the main and secondary electric motors, wherein each discharge valve further includes a ball bushing slidably mounted inside a stationary structure and having a head that is mounted to bear against the cam, the ball bushing including a return spring which maintains the head permanently pressing against the cam such that the cam remains permanently bearing against the valve body, wherein the cam presents a notch, and the head rests in the notch when the discharge valve is in the closed position.

2. The system according to claim 1, including a plurality of discharge valves and a single main electric motor, the camshafts of the discharge valves being connected together by a movement transmission cable.

3. The system according to claim 1, including a plurality of discharge valves and a plurality of main electric motors associated with each discharge valve to drive the camshaft of each of the discharge valves in rotation.

4. The system according to 1, wherein the electronic control system includes a device for each electric motor which measures a current needed to actuate the motor before starting, and which compares the measured current value with a predetermined threshold value.

5. The system according to claim 1, wherein the electronic control system is an electronic module of a full authority digital engine control system of the turbomachine.

6. The system according to claim 1, wherein a first end of the valve body abuts a wall provided at a first end of the air passage in the closed position.

7. The system according to claim 6, wherein the cam presses against a second end of the valve body.

8. The system according to claim 1, wherein a first end of the return spring is fastened to the ball bushing and a second end of the return spring is fastened to an end wall of the stationary structure.

9. The system according to claim 8, wherein the stationary structure includes walls extending radially from the end wall and surrounding the ball bushing and the return spring.

10. An aviation turbomachine compressor including an air discharge system, the air discharge system comprising:
 a discharge valve disposed between a primary channel of the turbomachine and a secondary channel of the turbomachine, the primary channel being level with the compressor, and an outer shroud of the compressor including an air bleed orifice opening out into the secondary channel via the discharge valve, the discharge valve comprising:
  an air passage extending between the primary channel and the secondary channel;
  a valve body which moves inside the air passage between an open position, in which a fraction of air flowing in the primary channel is taken off and injected into the secondary channel by flowing along the air passage, corresponding to the discharge valve being open and a closed position, in which the valve body closes the air passage and prevents the air flowing in the primary channel to be injected into the secondary channel corresponding to the discharge valve being closed, the valve body presenting a body of revolution which is centered on a longitudinal axis of the air passage;
  a camshaft including a cylindrical rod provided with a cam, said cam being mounted to press against the valve body in such a manner that rotating the camshaft causes the valve body to move between the open and closed positions; and
  a device which maintains the cam to permanently press against the valve body;
 a main electric motor having a rotor which drives the camshaft of the discharge valve in rotation;
 a secondary electric motor having a rotor in common with the rotor of the main electric motor; and
 an electronic control system configured to control the main and secondary electric motors, wherein each discharge valve further includes a ball bushing slidably mounted inside a stationary structure and having a head that is mounted to bear against the cam, the ball bushing including a return spring which maintains the head permanently pressing against the cam such that the cam remains permanently bearing against the valve body, wherein the cam presents a notch, and the head rests in the notch when the discharge valve is in the closed position.

11. An aviation turbomachine including an air discharge system, the air discharge system comprising:
 a discharge valve disposed between a primary channel of the turbomachine and a secondary channel of the turbomachine, the primary channel being level with the compressor, and an outer shroud of the compressor including an air bleed orifice opening out into the secondary channel via the discharge valve, the discharge valve comprising:
  an air passage extending between the primary channel and the secondary channel;
  a valve body which moves inside the air passage between an open position, in which a fraction of air flowing in the primary channel is taken off and injected into the secondary channel by flowing along the air passage, corresponding to the discharge valve being open and a closed position, in which the valve body closes the air passage and prevents the air flowing in the primary channel to be injected into the secondary channel corresponding to the discharge valve being closed, the valve body presenting a body of revolution which is centered on a longitudinal axis of the air passage;
  a camshaft including a cylindrical rod provided with a cam, said cam being mounted to press against the valve body in such a manner that rotating the camshaft causes the valve body to move between the open and closed positions; and
  a device which maintains the cam to permanently press against the valve body;
 a main electric motor having a rotor which drives the camshaft of the discharge valve in rotation;
 a secondary electric motor having a rotor in common with the rotor of the main electric motor; and
 an electronic control system configured to control the main and secondary electric motors, wherein each discharge valve further includes a ball bushing slidably mounted inside a stationary structure and having a head that is mounted to bear against the cam, the ball bushing including a return spring which maintains the head permanently pressing against the cam such that the cam remains permanently bearing against the valve body, wherein the cam presents a notch, and the head rests in the notch when the discharge valve is in the closed position.

* * * * *